July 1, 1930. J. G. CAMPBELL 1,768,565
ELECTRICAL APPARATUS
Filed March 6, 1924
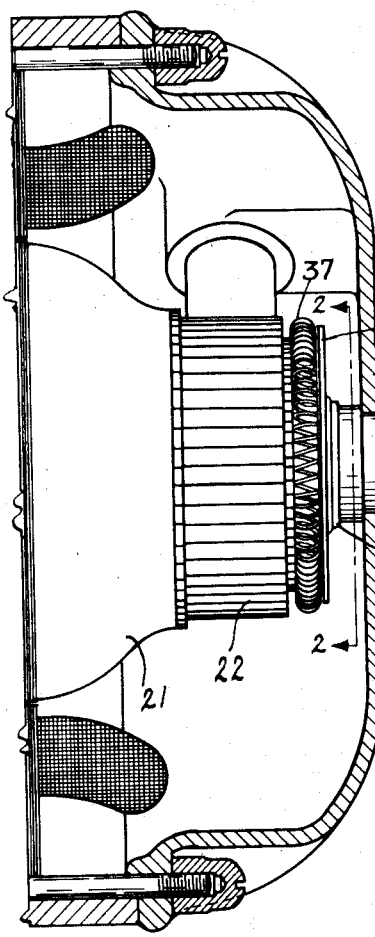
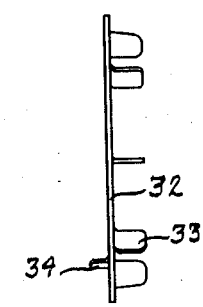
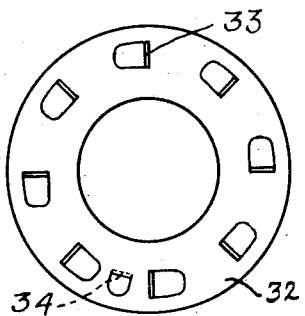
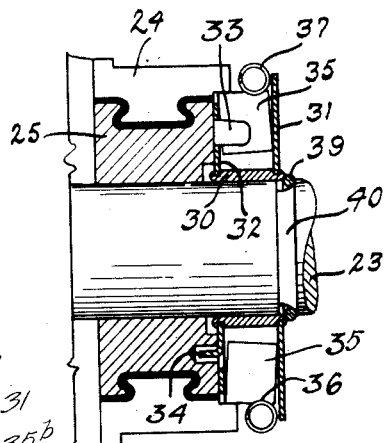
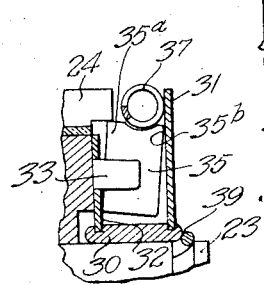
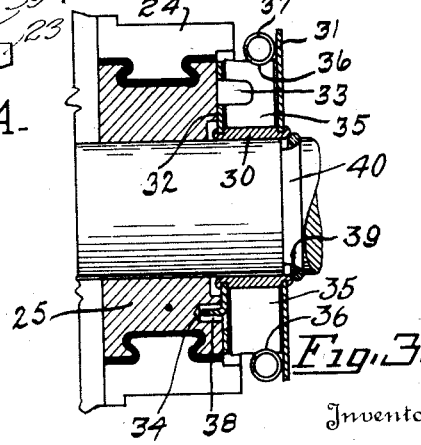
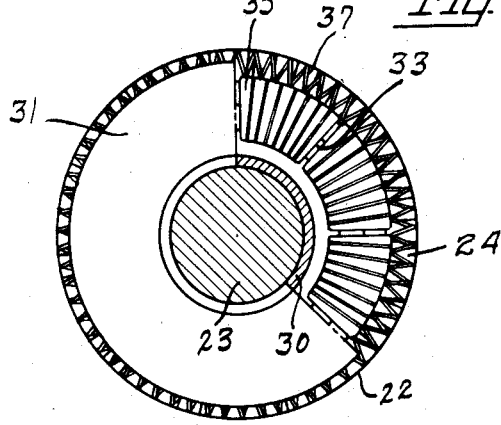
Inventor
John G. Campbell
By Spencer Serall and Hardman
His Attorneys Patented July 1, 1930

1,768,565

UNITED STATES PATENT OFFICE

JOHN G. CAMPBELL, OF DAYTON, OHIO, ASSIGNOR, BY MESNE ASSIGNMENTS, TO FRIGIDAIRE CORPORATION, A CORPORATION OF DELAWARE

ELECTRICAL APPARATUS

Application filed March 6, 1924. Serial No. 697,396.

This invention relates to repulsion induction motors of the type having a commutator for starting the motor, during which time the motor operates as a repulsion motor, and including means for short circuiting the commutator segments so that the motor will operate as an induction motor after being brought up to a predetermined speed.

One of the objects of the present invention is to simplify the construction of the commutator short circuiting device and to provide for obtaining better electrical contact between the commutator segments and the device which short circuits them.

Further objects and advantages of the present invention will be apparent from the following description, reference being had to the accompanying drawings, wherein a preferred form of embodiment of the present invention is clearly shown.

In the drawings:

Fig. 1 is a fragmentary sectional view showing a motor commutator provided with a form of the present invention.

Fig. 2 is an end view of the commutator and short-circuiting device taken on the line 2—2 of Fig. 1, a part thereof being broken away for the sake of clearness.

Fig. 3 is a sectional view of the commutator and short-circuiting device showing short-circuiting bars out of engagement with the commutator segments.

Fig. 3A is a view similar to Fig. 3 showing the position of the short-circuiting bars while moving radially.

Fig. 4 is a view similar to Fig. 3 showing the position which the short-circuiting bars assume when the motor is operating at full speed.

Figs. 5 and 6 are edge and plan views, respectively, of a part of the short-circuiting device.

Referring to the drawings, 20 designates a frame of a motor which supports an armature 21 and a commutator 22 carried by a shaft 23. The commutator 22 includes a plurality of segments 24 mounted upon a hub 25 but insulated therefrom and from each other in any suitable manner. As shown in Figs. 3 and 4, the commutator segments project beyond the side of the hub 25.

The commutator short-circuiting device includes a sleeve 30 attached to disk 31 and disk 32, the latter being shown in Figs. 5 and 6 in detail. A sheet metal disk 32 includes a plurality of punched out lugs 33 extending at right angles to the ring portion of the disk and on one side thereof, and a punched out lug 34 extending from opposite of the ring portion of the disk.. Between the lugs 33 there are located groups of short-circuiting bars 35, each provided with a notch 36 for receiving coil spring 37. Bars 35 are adapted to move translatably in a radial direction when the motor is started due to centrifugal force and when moved radially, there is clearance between each bar. The lugs 33 function as retainers for the bars 35 and divide the bars into a plurality of groups. In this manner said bars are maintained in radial alignment with the commutator segments 24 and are prevented from grouping in one large set. As shown in Figs. 3 and 4, the spring 37 is located much nearer to the disk 31 than to the disk 32. It will also be noted that the short-circuiting bars 35 are substantially less in width than the distance between disks 31 and 32.

The lug 34 engages a recess 38 provided in the hub 25 for preventing rotation of the short-circuiting device with respect to the commutator. The sleeve 30 is retained in position shown by means of a wire split ring 39 which engages a groove 40 in the shaft 23.

When the motor is at rest the short-circuiting bars will be maintained against the sleeve 30 by means of the spring 37 as shown in Fig. 3. As the speed of the motor increases, the bars 35 fly outwardly against the restraining action of the spring 37 and also will rotate slightly, the spring 37 providing a fulcrum for each of the bars 35 and the bars will move first to the position shown in Fig. 3A in which the inner peripheral edge 35ª of the bars will engage the underside of segments 24 and the outermost side 35ᵇ of the bars will engage the disk 31. Since the bars may rock as well as move radially from the shaft 23, all of the bars will engage the under surface of the overhanging commutator segments regardless of slight variations in dimensions of the spring 37 or the bars 35. Since the line of action of the spring 37 upon any bar 35 is substantially offset from the line of action of centrifugal force passing through the center of mass of the bar, it is apparent that centrifugal force will not be taken up entirely by the action of the spring 37 but some of this force will be applied to the overhanging ends of the commutator segments.

Therefore after the bars 35 have moved to the position shown in Fig. 3A, they will continue to move radially, the segments 24 functioning as a fulcrum for the bars. This further movement of the bars will cause same to rock to the position shown in Fig. 4 and while said bars are moving from the position shown in Fig. 3A to the position shown in Fig. 4, the inner peripheral edge 35ᵃ will move inwardly toward the commutator and relative to the underside of the commutator segments 24 while in engagement therewith, and at the same time, the sides of the bars 35 will slide along the disk 31. In this manner the bars 35 will wipingly engage the commutator segments 24 and the disk 31 whereby a good electrical connection is made between the commutator segments 24 and the conductor plate 31 to short circuit the segments. The shape of the upper edge of each bar 35 is such that when the bar is in its extreme position during full speed motor operation, the upper edge is parallel with the under side of segment 24.

The short-circuiting device is constructed as a unit and therefore can be assembled and tested before placing same on the motor.

While the form of embodiment of the present invention as herein disclosed, constitutes a preferred form, it is to be understood that other forms might be adopted, all coming within the scope of the claims which follow.

What is claimed is as follows:

1. The combination with a motor rotor having a shaft and a plurality of commutator segments arranged about said shaft, a plurality of conductor plates arranged transversely to the axis of the shaft, a series of contacts between said plates and translatably movable in a radial direction to engage said segments, and means tending to hold the contacts out of engagement with the segments, said means being applied to each contact at a point substantially removed from the line of action of centrifugal force acting upon that contact whereby the contacts will tilt to engage said conductor plates, means on said segments for limiting the radial movement of a portion of each of the contacts and for providing a fulcrum for said contacts to cause the contacts to tilt in another direction.

2. The combination with a motor rotor having a shaft, said rotor being recessed to provide a shoulder, of a plurality of contact members arranged about the shaft; and means for interconnecting said contacts including centrifugally operated members, and retaining means for said centrifugally operated member including a retaining plate, said plate having an ear extending within the recess and engaging said shoulder for driving said means.

3. The combination with a motor rotor having a shaft and a shoulder, a plurality of contact members arranged about the shaft; and means for interconnecting said contact members including centrifugally operated members and retaining means for said centrifugally operated members, said retaining means having a shoulder extending from one side thereof and engaging the rotor shoulder, and having means extending from the opposite side and between certain of said centrifugally operated members.

4. The combination with a motor rotor element having a shaft, a plurality of contact members arranged about the shaft; and means for interconnecting said contact members including centrifugally operated members, and a retaining element for said centrifugally operated members, one of said elements being recessed to provide a shoulder and the other of said elements having a shoulder extending within the recess and engaging the first shoulder for driving said means.

5. The combination with a motor rotor element having a shaft, a plurality of contact members arranged about the shaft; and means for interconnecting said contact members including centrifugally operated members, and a retaining element for said centrifugally operated members, said elements each having a shoulder extending longitudinally of the shaft and engaging one another for driving said means.

6. The combination of a motor rotor having a shaft and a plurality of commutator segments arranged about the shaft; a series of centrifugally operated contacts translatably movable in a plane substantially at right angles to the axis of the shaft and arranged to engage said segments; a conductor plate; and means for causing the contacts to tiltingly and wipingly engage said conductor plate and segments when moved outwardly by centrifugal action, said means including a resilient member tending to hold the contacts out of engagement with the segments, and means for limiting the radial movement of a portion of each of the contacts and for providing a fulcrum for said portion, said last means including an overhanging portion of the segments lying in the plane of movement of the contacts.

7. The combination of a motor rotor having a shaft and a plurality of commutator segments arranged about said shaft; a plurality of spaced conductor members; a series of centrifugally operated contacts between said members translatably movable in a radial direction to engage said segments; and means for causing the contacts to tiltingly engage said conductor members and for causing same to wipingly engage the segments when moved outwardly by centrifugal action, said means including a resilient member normally tending to hold the contact out of engagement with the segments, and means on said segments for limiting the radial movement of a portion of each of the contacts and for providing a fulcrum for said portion.

In testimony whereof I hereto affix my signature.

JOHN G. CAMPBELL.